(12) United States Patent
Roth et al.

(10) Patent No.: US 9,655,077 B1
(45) Date of Patent: May 16, 2017

(54) DEVICE AND METHOD FOR CELLULAR SYNCHRONIZATION ASSISTED LOCATION ESTIMATION

(71) Applicant: The United States of America, as represented by the Secretary of the Navy, Washington, DC (US)

(72) Inventors: John David-Dickson Roth, Annapolis, MD (US); Murali Tummala, Monterey, CA (US); John C. McEachen, Carmel, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/225,174

(22) Filed: Aug. 1, 2016

Related U.S. Application Data (60) Provisional application No. 62/208,028, filed on Aug. 21, 2015.

(51) Int. Cl.
  *H04W 24/00* (2009.01)
  *H04W 64/00* (2009.01)
  *H04W 24/10* (2009.01)
  *H04W 56/00* (2009.01)

(52) U.S. Cl.
  CPC ......... *H04W 64/003* (2013.01); *H04W 24/10* (2013.01); *H04W 56/001* (2013.01)

(58) Field of Classification Search
  CPC .. H04W 64/003; H04W 56/001; H04W 24/10
  See application file for complete search history.

(56) References Cited

U.S. PATENT DOCUMENTS

| | | | |
|---|---|---|---|
| 2006/0009236 A1* | 1/2006 | Bose ..................... | G01S 5/0252 455/456.1 |
| 2013/0225192 A1* | 8/2013 | Yamamoto ............ | H04W 16/16 455/452.1 |
| 2014/0179345 A1* | 6/2014 | Gunnarsson ............ | H04W 4/02 455/456.1 |
| 2015/0189610 A1* | 7/2015 | Siomina .................. | G01S 5/021 370/280 |

OTHER PUBLICATIONS

Whitty, R., M. Tummala, and J. McEachen, "Precision geolocation of mobile wimax subscribers using timing adjust measurements," Proc. 45th Hawaiii Int. Conf. Sys. Sci., 2012, pp. 5639-5648.

Jarvis, L., "Geolocation of LTE subscriber stations based on the timing advance ranging parameter," Naval Postgraduate School, Thesis, Dec. 2010, pp. 1-103.

Jarvis, L., J. McEachen, and H. Loomis, "Geolocation of LTE subscriber stations based on the timing advance ranging parameter," Proc. Military Commun. Conf., 2011, pp. 180-187.

(Continued)

*Primary Examiner* — Ajit Patel
(74) *Attorney, Agent, or Firm* — Naval Postgraduate School; Lisa A. Norris (57) ABSTRACT

A device and method for determining the location of a cellular device, such as a mobile cell phone, utilizing a Timing Advance (TA) issued by one or more cellular base stations, such as an LTE or LTE-A enhanced NodeB (eNB), to the cellular device.

19 Claims, 8 Drawing Sheets

(56) References Cited

OTHER PUBLICATIONS

Roth, J., M.Tummala, J. McEachen, J. Scrofani, "On mobile positioning via Cellular Synchronization Assisted Refinement (CeSAR) in LTE and GSM networks," 9th International Conference on Signal Processing and Communication Systems, (ICSPCS), Dec. 2015, pp. 1-8, DOI 10.1109/ICSPCS.2015.7391798.
Roth, J., M. Tummala, J. Scrofani, "Cellular Synchronization Assisted Refinement (CeSAR): A Method for Accurate Geolocation in LTE-A Networks," 2016 49th Hawaii International Conference on System Sciences, 2016, pp. 5842-5850, DOI 10.1109/HICSS.2016.723.

* cited by examiner

DEVICE AND METHOD FOR CELLULAR SYNCHRONIZATION ASSISTED LOCATION ESTIMATION

CROSS-REFERENCE TO RELATED APPLICATIONS

This application claims the benefit of U.S. Provisional Application No. 62/208,028 filed Aug. 21, 2015, which is hereby incorporated in its entirety by reference.

BACKGROUND OF THE INVENTION

1. Field of the Invention

The present invention relates generally to devices and methods for locating a network device, such as cellular device, in a cellular network. More particularly, the invention relates to devices and methods for locating the position of a network device communicating on an orthogonal frequency division multiplexing (OFDM) network, such as a Long Term Evolution or Long Term Evolution-Advanced (LTE/LTE-A) network.

2. Description of the Related Art

Long Term Evolution (LTE) is a high speed wireless technology for providing communication services to mobile cellular devices. The LTE access network is a network of base stations, termed evolved NodeBs (eNBs). The current LTE network positioning architecture utilizes a network-centric positioning scheme termed the LTE Positioning Protocol (LPP). LPP currently supports three positioning methods: assisted-global navigation satellite system (A-GNSS), observed time difference of arrival (OTDOA), and enhanced-cell identification (E-CID).

With the widespread adoption of the Global Positioning System (GPS) and related systems, A-GNSS has been one choice for mobile positioning. A-GNSS, while reasonably accurate, suffers from power-hungry implementations and requires additional specific hardware in the mobile device. Further, A-GNSS suffers from a vulnerability to severe multipath channels, such as those found in metropolitan canyons and indoor environments.

OTDOA requires the use of specific time-frequency resources in each frame in order to transmit a positioning reference signal from several adjacent eNBs in LTE. The time difference is then recorded by the user equipment (UE) and transmitted back to the network for analysis. As the resulting systems of hyperbolic equations are usually inconsistent, an approximation technique must be used to form a position estimate. OTDOA also suffers in urban and indoor environments where non-line of sight (NLOS) and multipath environments channels dominate.

The E-CID option was developed as part of the LPP in answer to the multipath problem. In E-CID the network requests the UE make certain signal measurements, e.g., signal strength, channel quality, cell ID, etc., and send them back to the network for analysis. The network then compares the current signal measurements and matches them with previously made measurements stored in a network database. While this radio fingerprinting method has achieved relative success and is more robust in multipath environments, this method suffers from high up front database creation costs, database maintenance costs, and is limited by each individual UE's measurement capabilities. Thus, each LPP positioning method suffers from particular flaws, but the common problem is that each method builds on the existing infrastructure and requires additional valuable bandwidth to provide a UE its location.

SUMMARY OF THE INVENTION

Embodiments in accordance with the invention include a device and method for cellular synchronization assisted location estimation of a cellular device for use with LTE/LTE-A compliant networks. The device and method utilize an existing network timing management signal, termed the timing advance (TA), together with uplink transmissions from a cellular device to provide a position estimate of the cellular device. Embodiments in accordance with the invention mitigate many of the weaknesses noted in current LTE/LTE-A cellular positioning technologies while providing a comparable level of accuracy. The method requires no additional network infrastructure, no additional network bandwidth or cooperation, and is power frugal. The method can be used as a complimentary positioning technology as well as to locate a cellular device by a third party device. The method can be implemented without a cooperative network and is passive, in that a third party device utilizing the method does not need to identify itself to the network or the cellular device.

In accordance with one embodiment, a method for cellular synchronization assisted location estimation of a target device in a cellular service area by a sensor device includes: obtaining a location of the sensor device; obtaining a location of an evolved NodeB (eNB) in an LTE/LTE-A network; establishing downlink synchronization with the eNB; determining a downlink frame timing of the eNB; monitoring transmissions sent from the eNB for a timing advance (TA) sent from the eNB to a target device; obtaining the TA transmitted by the eNB to the target device; determining an annulus, $T_{TA}$, around the eNB based on the TA; determining an uplink frame burst time for the target device; obtaining an uplink frame sent by the target device to the eNB; determining a distance, d, from the sensor device to the target device; determining a circle, $T_{circle}$, around said sensor device at the distance, d, from the sensor device to the target device; determining a refined locus, $T_l$, based on an intersection of the annulus, $T_{TA}$, and the circle, $T_{circle}$; and determining a location of the target device in the refined locus.

In accordance with one embodiment of the invention, a cellular device for cellular synchronization assisted location estimation of a target device in a cellular service area includes: an antenna for monitoring and receiving communications transmitted over a LTE/LTE-A network; and a processing component configured to perform a method for cellular synchronization assisted location estimation of a target device, the method including: obtaining a location of the sensor device; obtaining a location of an evolved NodeB (eNB) in an LTE/LTE-A network; establishing downlink synchronization with the eNB; determining a downlink frame timing of the eNB; monitoring transmissions sent from the eNB for a timing advance (TA) sent from the eNB to a target device; obtaining the TA transmitted by the eNB to the target device; determining an annulus, $T_{TA}$, around the eNB based on the TA; determining an uplink frame burst time for the target device; obtaining an uplink frame sent by the target device to the eNB; determining a distance, d, from the sensor device to the target device; determining a circle, $T_{circle}$, around said sensor device at the distance, d, from the sensor device to the target device; determining a refined locus, $T_l$, based on an intersection of the annulus, $T_{TA}$, and the circle, $T_{circle}$; and determining a location of the target device in the refined locus. In some embodiments, the cellular device includes a locator device communicatively coupled to the cellular device.

Embodiments in accordance with the invention are best understood by reference to the following detailed description when read in conjunction with the accompanying drawings

Embodiments in accordance with the invention are further described herein with reference to the drawings.

DETAILED DESCRIPTION OF THE INVENTION

Broadly viewed, embodiments in accordance with the invention include a device and method for determining the location of a cellular device, such as a mobile cellular phone, utilizing a Timing Advance (TA) issued by an eNB, such as an LTE or LTE-A eNB, to the cellular device. In one embodiment, a sensor device, such as a cellular device capable of receiving LTE or LTE-A transmissions uses downlink synchronization to refine an area within an initial timing advance annular locus in which a target device, such as a second cellular device, may be located and determines the location of the target device within that area. Embodiments in accordance with the invention are further described with continuing reference to the figures. Herein descriptions made referring to LTE are also applicable to LTE-A.

LTE is a time-synchronized network. LTE uses orthogonal frequency division multiplexing (OFDM) as the vehicle for air interface communication. LTE facilitates higher data rates and requires tight time synchronization between user equipment (UE), such as a cellular device, and an eNB. A UE's uplink frames must arrive at the eNB at very precise intervals. As the UE's propagation delay to an eNB may change based on the UE's current position, LTE utilizes a timing advance parameter, TA, to align the UE's transmission time to that of the LTE network. An LTE network uses two forms of the TA to control user equipment transmissions during normal cellular operation.

The first form of the TA, herein termed a first TA, is issued upon initial entry of the UE into the network. To enter the network, a UE searches for a primary search signal (PSS) and secondary search signal (SSS) which are regularly broadcast from each network eNB. Upon acquisition of the PSS/SSS signal by the UE, the UE establishes downlink synchronization with the eNB. The uplink timing is then approximated by the UE and a random access preamble is transmitted from the UE to the eNB of the network.

Figure 1:
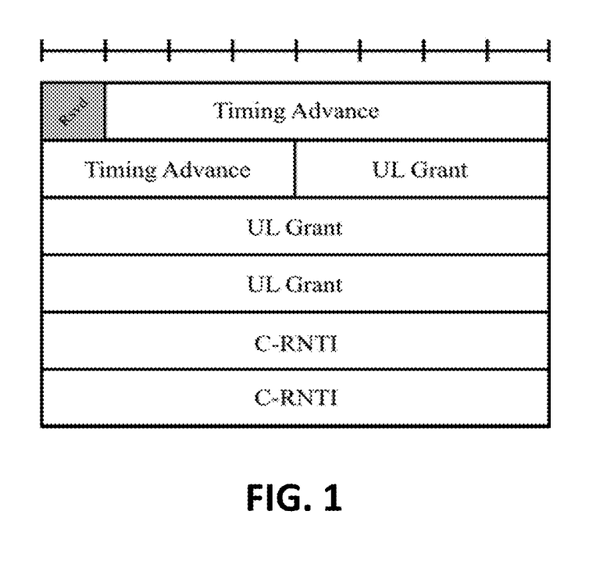
FIG. 1 illustrates a representation of a RAR message including an 11 bit TA used in establishing initial uplink timing of a cellular device.

Upon receipt of the random access preamble by the eNB, a random access response (RAR) message is transmitted to the user equipment. Within the RAR is an 11-bit first TA quantity, where TA$\in\{0, 1, \ldots, 1282\}$, which specifies for the UE, in absolute terms, when the UE should begin its uplink bursts. FIG. 1 illustrates a representative drawing of a RAR message containing a first TA. Each bit represents a time interval of $16 \times TA \times T_S$, where $T_S$ is the sampling frequency. A UE locates the RAR by monitoring the L1/L2 control region, i.e., the physical dedicated control channel (PDCCH), within a selected amount of time after the random access preamble is transmitted. The PDCCH identifies to the UE where on the physical downlink shared channel (PDSCH) the RAR is scheduled. Location of a RAR and a first TA by a UE on an LTE/LTE-A network is well known to those of skill in the art.

Figure 2:
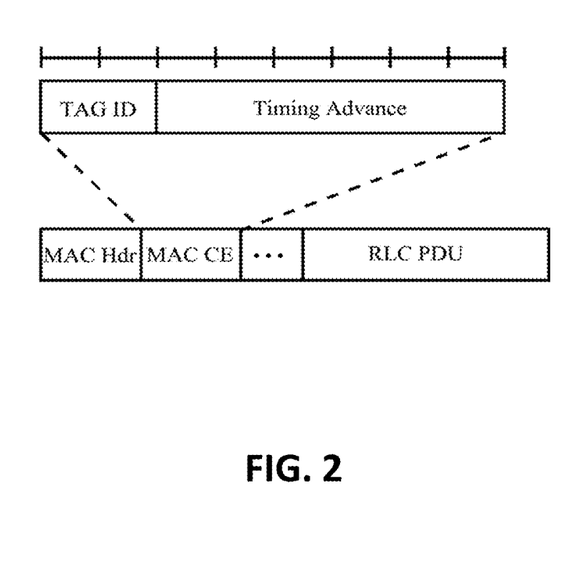
FIG. 2 illustrates a representation of a MAC CE including a six bit relative TA used as a maintenance command.

The second form of the TA, herein termed a second TA, utilized by the LTE network is a maintenance command used during normal operation after a UE has linked to the eNB, and allows the network to maintain timing alignment with the UE as the UE moves throughout the network. The second TA is sent as a Medium Access Control (MAC) control element (CE) in a MAC header. The second TA is a 6-bit relative quantity TA where TA $\in \{0, 1, \ldots, 63\}$. The relative nature of this quantity means that a UE will advance or retard its uplink transmission timing from a current value by $16 \times (TA-31) \times T_S$ seconds in order to accommodate the dynamic propagation delay. FIG. 2 illustrates a representative drawing of a MAC header including a second TA. Location of a MAC header and a second TA by a UE on an LTE/LTE-A network is well known to those of skill in the art.

Current (as of release 11), the MAC CE further incorporates a 2 bit timing advance group (TAG) ID field. In a heterogeneous network (HetNet), in which multiple secondary eNBs, also termed secondary cells (SCells), are configured in addition to a primary eNB, also termed primary cell (PCell), the TAG ID located in the TAG ID field identifies to the UE which eNB sent the TA. This allows timing management from multiple groups of eNBs in physically different locations.

Because of the discrete nature of the TA, the spatial resolution is of particular interest. Each TA bit is interpreted as $16 \times T_S$ seconds, where $T_S \approx 32.5$ ns and is defined as the inverse of the product of the subcarrier spacing and Fast Fourier Transform size. If the speed of light, c, is used as the propagation speed, the spatial resolution, $S_{res}$, can be determined using $$s_{res} = \frac{c}{2}(16 \times T_s)$$

to be 78.125 meters (the extra factor of ½ is included to account for two way propagation delay). This implies that because max {TA}=1282, the maximum supportable cell size, i.e., eNB coverage area, is 100 km.

Both the first TA and the second TA are transmitted in the clear, i.e., unencrypted. The first TA which is located in the RAR is sent before a security key is negotiated with a UE and sent in the clear. The second TA is sent as a MAC CE in the MAC header which is below the Packet Data Convergence Protocol (PDCP) sublayer, which is responsible for encryption, and is thus also sent in the clear. Therefore, a UE with the ability to monitor LTE/LTE-A communications that is within range of an eNB can observe the transmissions of the first TA and the second TA.

As a plurality of users are typically simultaneously connected to a given eNB, each TA has a cell-radio network temporary identifier (C-RNTI) which serves as a temporary software address issued by the network to each UE. The C-RNTI is initially associated with a UE during network access negotiation and issued via the RAR. Second TAs are associated with a specific C-RNTI via downlink scheduling assignments made via the Physical Downlink Control Channel (PDCCH) found in the L1/L2 control region of each subframe. Because the L1/L2 control region of each subframe needs to be decoded by each UE, it is sent in the clear. Thus as further described herein a third party UE can use the information in the PDCCH to find the resource on which a transport block for a particular UE is located. The corresponding transport block could then be searched for a TA CE. As further described herein in order to initially associate a C-RNTI with a UE, a third party UE must observe a UE access the network in order to initially associate a C-RNTI with a UE.

As positioning can be of a continuous nature, and as the time to first fix (TTFF) is a reasonable quality of service metric, the frequency at which TAs are issued is of interest. This frequency is upper-bounded by a timeAlignmentTimer parameter which can be configured to assume values {500, 750, 1280, 1920, 2560, 5120, 10240, ∞}. The timeAlignmentTimervalues correspond to the maximum number of subframes which may pass without a TA update for the user equipment to still consider itself time aligned with the eNB. Because each subframe is 1 ms in duration, the timeAlignmentTimer values may be interpreted in milliseconds. Assuming a network implementation does not choose an infinite value, it can be assumed a TA is issued with an interval of no more than ~10 s. In practice, the number of TAs issued will be much more frequently, usually on the order of several times per second.

Figure 3:
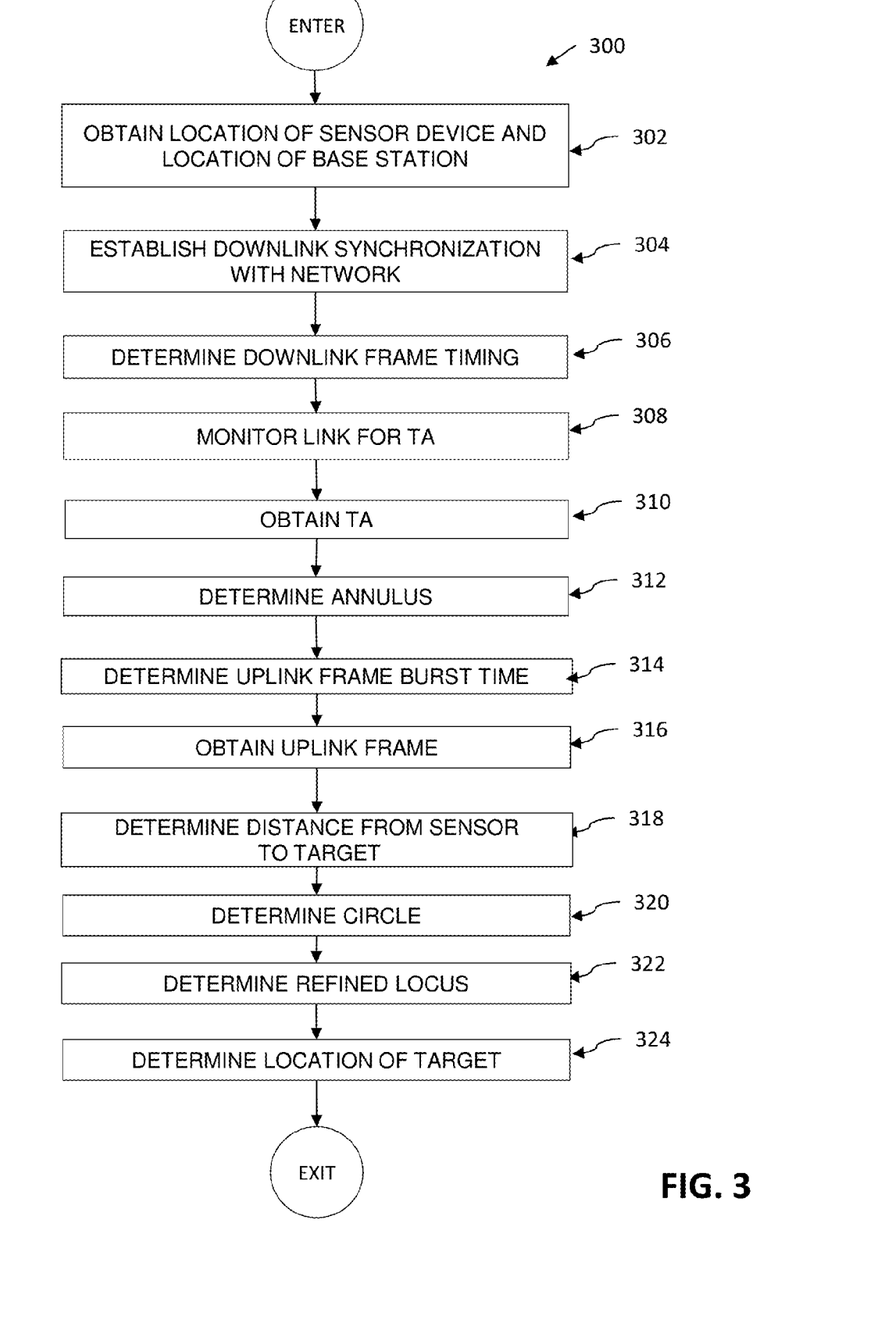
FIG. 3 illustrates a process flow diagram of a method for cellular synchronization assisted location estimation of a target cellular device by a sensor device in accordance with one embodiment of the invention.
Figure 4:
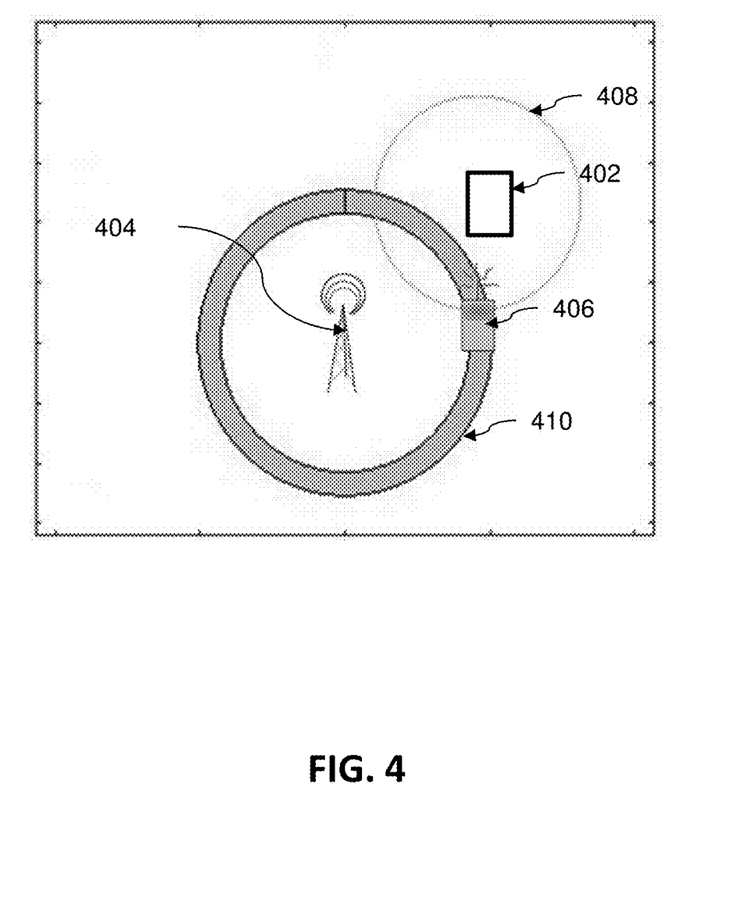
FIG. 4 illustrates a diagram of cellular synchronization assisted location estimation in an LTE/LTE-A network by a sensor device utilizing transmissions between a single eNB and a target device in accordance with one embodiment of the invention.

FIG. 3 illustrates a process flow diagram of a method for cellular synchronization assisted location estimation of a target cellular device by a sensor device in accordance with one embodiment of the invention. Referring now to FIGS. 1-5 together, in one embodiment, a location aware sensor device 402, such as shown in FIG. 4, is introduced into the cellular service area of a network eNB 404, such as an eNB providing communication on an LTE/LTE-A network. In one embodiment, sensor device 402 is a cellular device capable of monitoring and receiving transmissions on the network sent from one or more eNBs 404. In the current embodiment, sensor device 402 is implemented as a third party sensor device. In some embodiments, sensor device 402 can be implemented as an existing network picocell. In other embodiments, sensor device 402 can be implemented as a recruited peer device.

In operation 302 sensor device 402, also termed herein a first device, obtains its current location and obtains the location of eNB 404, also termed herein a base station. The location of sensor device 402 and/or the location of eNB 404 may be preloaded on sensor device 402, directly loaded on sensor device 402, sent to sensor device 402 over a communication link, or determined by sensor device 402 utilizing a locator device, such as GPS device connected to or in communication with sensor device 402.

In operation 304 sensor device 402 establishes downlink synchronization with eNB 404. For example, sensor device 402 receives a primary synchronization signal/secondary synchronization signal (PSS/SSS) transmitted from eNB 404 and synchronizes to eNB 404. The downlink synchronization is achieved passively, without identification of sensor device 402 to eNB 404. Downlink synchronization with a network, such as an LTE or LTE-A network is well known by those of skill in the art and not further detailed herein.

In operation 306, sensor device 402 determines the downlink frame timing at eNB 404. For example, sensor device 402 calculates the propagation delay between itself and eNB 404 using $$\Delta t = \frac{d}{c},$$

where $\Delta t$ is the time difference between sensor device 402's observed frame boundaries and eNB 404's sent frame boundaries, where d is the distance sensor device 402 is located from eNB 404, and c is the speed of light, e.g., speed of light in a vacuum, $2.99792458 \times 10^8$ m/s (approximately $3.00 \times 10^8$ m/s). The downlink frame timing at eNB 404 is then determined using the propagation delay. Determination of propagation delay and downlink frame timing in a network such as an LTE or LTE-A network is well known by those of skill in the art and not further detailed herein.

In operation 308 sensor device 402 passively monitors MAC headers sent from eNB 404 for TAs issued to target device 406.

In operation 310, when sensor device 402 detects a TA transmitted by eNB 404 to target device 406, sensor device 402 records the TA.

In operation 312, an annulus 410, herein also referred to as an annular locus 410, is determined. In one embodiment, annulus 410 is described by the TA and bounds an area of possible locations of target device 406 from eNB 404. Due largely to the discrete nature of a TA, a single measurement from an eNB will reduce the possible locations of target device 406 to an annulus of fixed width with eNB 404 as the center. In one embodiment, annulus 410, $T_{TA}$, is an annulus of width 78.125 meters, the center of which is the eNB 404 location.

In one embodiment, annulus 410 is calculated as:

$T_{TA}$=A'\A" where {A':|p|≤aβ+β/2} and {A":|p|<aβ-β/2} where β is the spatial resolution of TA, a∈ℤ is the TA value issued by the eNB, and p∈ℝ² is the set of positions in the cellular service area.

In an LTE network, the distance from the location of eNB 404 to the middle of annulus 410, $T_{TA}$, is calculated as:

$$d_{TA} = a\frac{16c}{2(15000 \times 2048)}$$

where a ∈[0, . . . , 1282] is the integer timing advance value found in the MAC control element sent from eNB 404, c is the speed of light, 15,000 corresponds to the subcarrier spacing, and 2048 is the FFT size.

In operation 314, sensor device 402 estimates the uplink frame burst time from target device 406 to eNB 404. In one embodiment, the uplink frame transmission timing is determined using the equation:

$$t_{tx} = t_{fb} - a\frac{16}{2(15000 \times 2048)}$$

where $t_{tx}$ is the calculated frame transmission time, $t_{fb}$ is the eNB 304 frame boundary time, a is the integer timing advance value found in the MAC control element sent from eNB 404.

In operation 316 sensor device 402 passively monitors the network for transmission of an uplink frame from target device 406 to eNB 404, and on receipt of the transmission of an uplink frame from target device 406 to eNB 404, records the uplink time.

In operation 318 sensor device 402 determines the distance from target device 406 to itself, i.e., sensor device 402, based on the propagation delay between when target device 406 sent the uplink frame to eNB 404 and when sensor device 402 detected the transmission of the uplink frame. In one embodiment the distance from target device 406 to sensor device 402 is calculated using $$d = \frac{\Delta t}{c},$$

where d is the distance between sensor device 402 and target device 406, Δt is the time difference from when target device 406 sent the uplink frame and when sensor device 402 receives, e.g., records, the uplink frame sent from target device 406, and c is the speed of light, e.g., speed of light in a vacuum, 2.99792458×10⁸ m/s (approximately 3.00×10⁸ m/s).

In operation 320, a circle 408, $T_{circle}$, of distance, d (calculated in operation 318) around sensor device 402 is determined. $T_{circle}$ defines possible locations around sensor device 402 on which target device 406 should lie.

In one embodiment, circle 408 is calculated as:
{$T_{circle}$:|p|=d} where d is given as in operation 318.

In operation 322, a refined locus of possible locations of target device 406 is determined. As target device 406 is estimated to lie somewhere in annulus 410, $T_{TA}$, and on circle 408, $T_{circle}$, an intersection of annulus 410, $T_{TA}$, and on circle 408, $T_{circle}$, is determined to be a refined locus $T_l$. In one embodiment the refined locus, $T_l$, of target device 406 from eNB 404 is calculated using:

$$T_l = T_{TA} \cap T_{Circle}$$

where $T_l$ is the refined locus obtained from performing the intersection of annulus 410, $T_{TA}$ and circle 408, $T_{circle}$.

In some embodiments where there is only one serving eNB, $T_l$ may be a disjoint set. In one embodiment, the disjoint set is resolved to one set using an ambiguity resolution technique. Ambiguity resolution techniques are well known to those of skill in the art. In the event the ambiguity cannot be resolved, the method has significantly reduced the locus size in which the target device 406 may be located to the disjoint sets.

In embodiments in which multiple eNBs and thus multiple annuli are available to sensor device 402, the locus $T_l$ is calculated using:

$$T_l = \bigcap_i T_{TA}^{Si} \cap T_{Circle}$$

where $T_{TA}^{Si}$ is the TA issued from the ith SCell.

In operation 324, a location of target device 406 is determined. In one embodiment, the position estimate, $\hat{p}$, i.e., the location, of target device 406 is determined as a point that is the centroid of $T_l$. In one embodiment, the position estimate of target device 406 is determined using:

$$\hat{p} = \min_p \|p - p_c\|$$

where $\hat{p}$ is the position estimate, p=(x,y) is any point in T=$T_{circle} \cap T_l$, and $p_c$=$(x_c,y_c)$ such that $p_c$ is the center of mass of T. In the event that $\hat{p}$ is not unique, the position estimate is randomly chosen, with uniform likelihood, from among the set of points described by $\min_p\|p-p_c\|$. In embodiments in which $T_l$ is a disjoint set and an ambiguity cannot be resolved, operation 324 can be performed on each set to arrive at position estimates.

Figure 5:
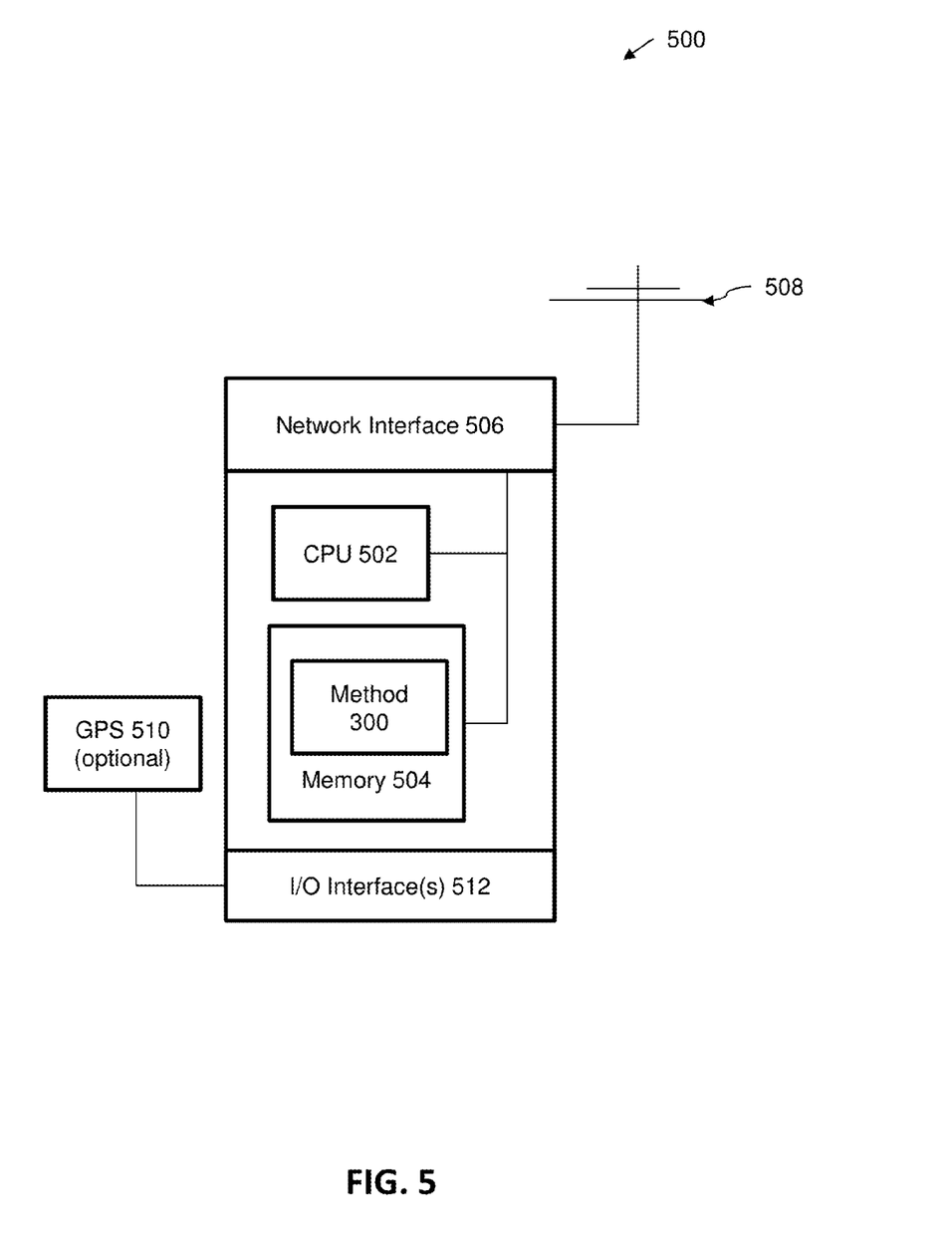
FIG. 5 illustrates a device including the method of FIG. 3 in accordance with one embodiment of the invention.

FIG. 5 illustrates a block diagram of a cellular device 500, such as target device 402, including method 300 for cellular synchronization assisted location estimation in accordance with one embodiment of the invention. In FIG. 5, device 500 includes a computer processing unit (CPU) 502, a memory 504, a network interface 506, and an antenna 508 for monitoring and receiving communications transmitted over a network, such as an LTE/LTE-A network. In some embodiments device 500 can also transmit to a network via antenna 508, such as to an LTE/LTE-A network. In some embodiments, device 500 is communicatively coupled to a locator device 510, such as Global Position System (GPS) device for receiving location information associated with device 500 as well as other devices, such as an eNB associated with an LTE/LTE-A network. In various embodiments device 500 can further include one or more I/O interfaces 512 to allow inputs from an input device, such as locator device 510, a keyboard, or other input device, and to allow outputs from device 500. In the present embodiment, cellular synchronization assisted location estimation method 300 is stored in memory 504. In other embodiments, cellular synchronization assisted location estimation method 300 can be stored on another computer system, such as a server system, and accessed by device 500 over a network.

Figure 6:
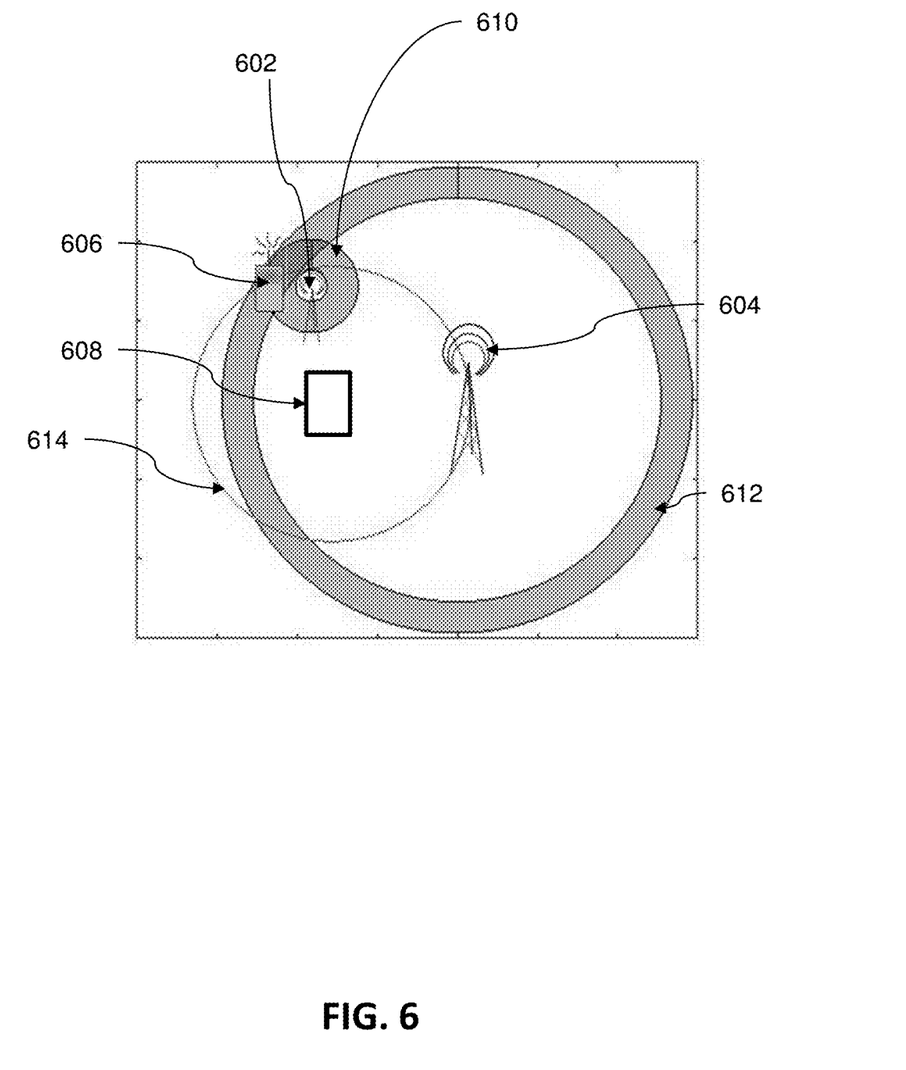
FIG. 6 illustrates a diagram of cellular synchronization assisted location estimation in an LTE/LTE-A network by a sensor device utilizing transmissions from a serving PCell, shown at the center of an annulus, together with one configured SCell with an annulus corresponding to the SCell TAG, and a target device in accordance with one embodiment of the invention.

In some embodiments, such as in a HetNet environment in which multiple eNBs are present, another embodiment of the method for cellular synchronization assisted location estimation can be used with further minimization of the locus due to the presence of multiple timing advances issued by multiple eNBs. Referring now to FIG. 6, in one embodiment at least two serving eNBs 602, 604, i.e., a secondary serving cell (SCell) and a primary serving cell (PCell), are in physically separate locations. In the current embodiment, while physically disperse SCells (also termed picocells or femtocells) are not a general requirement for heterogeneous networks, SCells are not collocated. This embodiment can be utilized for advanced target devices, such as a target device 606, enabled for carrier aggregation. In the present embodiment, multiple TAGs are used for the SCell(s) 602 and PCell 604 and are located within the structure of a TA CE, such as that shown in FIG. 2.

When each SCell is configured with its own TAG, a sensor device 608, similar to sensor device 402, monitors transmissions for all TAGs, $T_{TA}^{Si}$, associated with the C-RNTI of target device 606, and determines an annulus 610 for target device 606 around SCell 602 and an annulus 612 for target device 606 around PCell 604. The intersection of the resulting annuli is the area within which target device 606 is located and is determined using:

$$T_l = \bigcap_i T_{TA}^{Si} \cap T_{TA}^P$$

where i spans the set of SCells configured to target device 606 and $S^i$ is the ith SCell.

As earlier described with reference to operation 322 of method 300, the locus of possible locations of target device 606 can then be minimized by further intersecting the area with a circle 614, $T_{circle}$ (determined in operation 318). More particularly, in this embodiment, the distance from target device 606 to sensor device 608 is based on the propagation delay between when target device 606 sends an the uplink frame to either SCell 602 or PCell 604 and when sensor device 608 detects the transmission of the uplink frame. The distance from target device 606 to sensor device 608 is calculated using $$d = \frac{\Delta t}{c},$$

where d is the distance between sensor device 608 and target device 606, $\Delta t$ is the time difference from when target device 606 sends the uplink frame and when sensor device 608 receives, e.g., records, the uplink frame sent from target device 606, and c is the speed of light, e.g., speed of light in a vacuum, $2.99792458 \times 10^8$ m/s (approximately $3.00 \times 10^8$ m/s).

With circle 614, $T_{circle}$, determined, the locus of possible locations of target device 606 can be refined using:

$$T_l = \bigcap_i T_{TA}^{Si} \cap T_{TA}^P \cap T_{Circle}$$

In the present embodiment, illustrated in FIG. 6, only one SCell, SCell 602, is configured. In other embodiments, in which all SCells are configured to use a common TAG, the locus of possible locations, $T_l$, is determined using:

$$T_l = \bigcup_i T_{TA}^{Si} \cap T_{TA}^P \cap T_{Circle}$$

In this embodiment, in which only one TAG is used for all of the SCells, the shape of $$\bigcup_i T_{TA}^{Si}$$

from the perspective of sensor device 608 is non-circular. As sensor device 608 does not know which of the picocells 602, 604 is closest to target device 606, sensor device 608 must calculate an annulus assuming each of the picocells 602, 604 is closest. This results in the observed TA being placed around each serving picocell 602, 604 with each being just as likely to contain target device 606.

Figure 7:
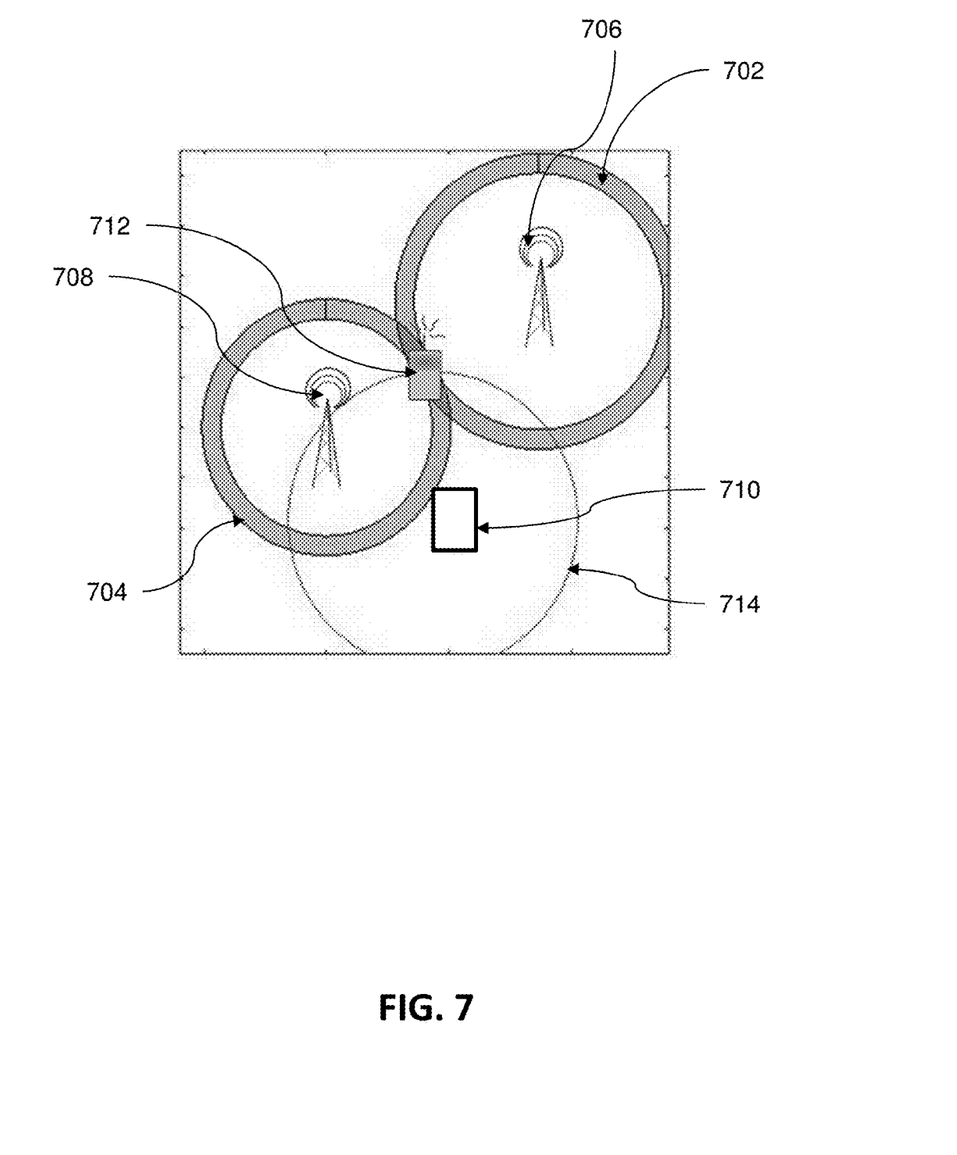
FIG. 7 illustrates a diagram of cellular synchronization assisted location estimation in an LTE/LTE-A network by a sensor device utilizing transmissions between an originating eNB, shown at the center of a TA annulus together with a target eNB and its corresponding annulus, and a target device in accordance with one embodiment of the invention.

In a further embodiment, the method for cellular synchronization assisted location estimation can be used while a PCell handover is initiated. During normal operation in an LTE/LTE-A network, the network may determine it is advantageous to hand responsibility for primary service over to a different eNB other than the one currently serving the UE. In this case, a sensor device can obtain TAs sent from originating eNBs participating in the handover. Referring now to FIG. 7, in one embodiment two annuli 702, 704 determined by a sensor device 710, such as a device similar to sensor device 402, from TAs sent from originating eNBs, 706, 708, respectively, intersect to form an area of possible locations of a target device 712. As earlier shown with reference to FIGS. 4 and 6, and method 300, the area of possible locations of target device 712 in the annuli overlap can be minimized by further intersecting the annuli intersection with a circle 714, determined as earlier detailed in method 300, and determining a position estimate on the resulting locus $T_l$, as also earlier detailed in method 300.

Figure 8:
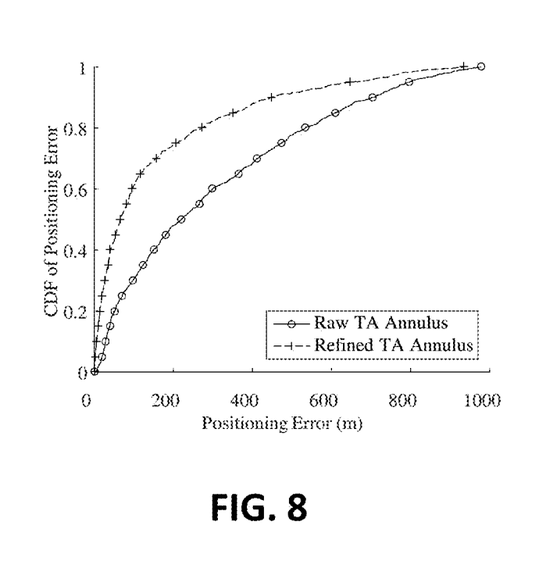
FIG. 8 illustrates a chart comparison of the simulated performance of locating a target device with only the observed TA with that of the observed TA refined utilizing cellular synchronization assisted location estimation in accordance with one embodiment of the invention.
Figure 9:
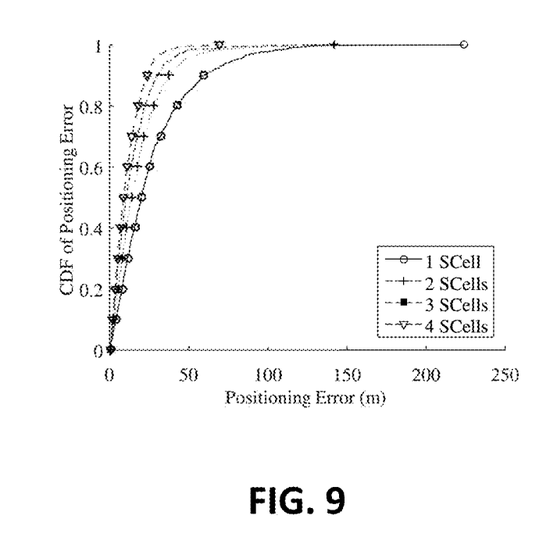
FIG. 9 illustrates a chart comparison of the simulated performance of locating a target device in heterogeneous network deployments where each SCell is assigned a unique TAG and cellular synchronization assisted location estimation is utilized in accordance with one embodiment of the invention.
Figure 10:
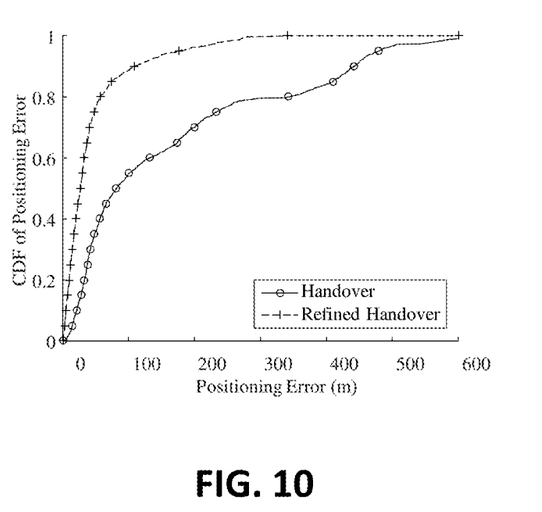
FIG. 10 illustrates a chart comparison of the simulated performance of locating a target in a macro cell handover with and without the TA refined utilizing cellular synchronization assisted location estimation in accordance with one embodiment.

FIGS. 8-10 illustrate simulation results of locating a target device both with and without cellular synchronization assisted location estimation. The illustrated results were obtained via Monte Carlo simulation over the course of 1000 trials per curve. In all cases error is defined as the distance from the estimated target location to the actual target location in a Euclidean sense. Parameters for the simulations are represented in Table 1.

TABLE 1

Parameters for network simulation.

| Parameter | Value |
| --- | --- |
| Cell Size | 500 m |
| Trials per Simulation | 1000 |
| Sensor Distribution | Uniform |
| Target Distribution | Uniform |
| TA Uncertainty ($E_{TA}$) | 78.125 m |
| Target-Sensor Distance | $\geq E_{TA}/2$ |
| eNB Height Error [14] | 0 m |
| NLOS Propagation Error | 0 m |
| Network Synchronization Error | 0 m |
| Clock Bias Error | 0 m |
| Handover Event Location | N ($\mu = p_{cb}$, $\sigma = 70$ m) |

TABLE 1-continued

Parameters for network simulation.

| Parameter | Value |
|---|---|
| Pico Cell Distribution | $P_{cb}$ = Cell boundary<br>N ($\mu$ = $p_T$, $\sigma$ = 200 m)<br>$p_T$ = Target location |

Referring now to FIG. 8, the performances of attempts to locate a target with only one observed TA from a PCell with and without cellular synchronization assisted location estimation are presented via a cumulative distribution function (CDF). In a first curve, identified as "Raw TA Annulus," when only one TA is available and cellular synchronization assisted location estimation is not used, the estimated target location is selected from a set of guesses uniformly distributed throughout the annulus. The low performance in this technique can be explained by the high degree of uncertainty offered by a large locus. Small errors are representative of scenarios when the TA quantity is small, i.e., a UE is physically close to the eNB, or in an unlikely scenario where the estimated position is chosen very near to the actual target location. Large errors are accounted for by large TA values, i.e., a UE is near or on the cell boundary, and when the estimated position is chosen on the opposite side of the annulus as the actual target device location. The first curve exhibits a near uniform appearance with a slight non-uniformity accounted for by the irregular shape of the locus.

In contrast to the first curve, a second curve, identified as "Refined TA Annulus," illustrates the performance improvements realized through utilization of cellular synchronization assisted location estimation. The second curve exhibits a more exponential distribution, shifting a majority of errors to much lower values. In this simulation, the application of cellular synchronization assisted location estimation results in a 254 meter improvement in the circular error probable (CEP) 70% metric.

Referring now to FIG. 9 the results of locating a UE configured for carrier aggregation in an LTE-A release 11+ heterogeneous deployments are illustrated where each SCell is assigned a unique TAG and cellular synchronization assisted location estimation is utilized as described with reference to a HetNet environment in which multiple eNBs are present. In FIG. 9, the estimated location is the center of $T_l$ resulting from $$T_l = \bigcap_i T_{TA}^{Si} \cap T_{TA}^{P} \cap T_{Circle}$$

as earlier described with reference to method 300. The utilization of cellular synchronization assisted location estimation gives the error distribution a more exponential form. In these simulations the CEP 70% ranges from 32 meters with one SCell configured to 14 meters with four SCells configured. As evidenced in FIG. 9, more configured SCells result in better accuracy.

Referring now to FIG. 10, simulation results of a handover scenario with and without cellular synchronization assisted location estimation are shown. This type of scenario can be realized in legacy networks with legacy UEs. In addition to initial cell association, the handover provides the unique link between the arbitrary C-RNTI and the UE which a passive device, such as a sensor device, will need in order to identify the correct TA. Also, the initial TA is issued to the UE from the target cell thus establishing a baseline upon which all further TAs are given. The intersecting rings from both eNBs provide additional location based information not normally available. In this scenario, the locus of possible target device locations is defined as the intersection of TAs from the target eNB and the source eNB. As illustrated in the first curve, identified as "Handover," the CEP 70% is 200 meters without the utilization of cellular synchronization assisted location estimation. In the second curve, identified as "Refined Handover," the CEP 70% is 41 meters with utilization of cellular synchronization assisted location estimation—a significant improvement.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure. In particular those of skill in the art can recognize that the operations of method 300 are not limited to the order presented and other orders can be utilized.

What is claimed is:

1. A method for cellular synchronization assisted location estimation of a target device in a cellular service area by a sensor device comprising:
   obtaining a location of said sensor device;
   obtaining a location of an evolved NodeB (eNB) in an LTE/LTE-A network;
   establishing downlink synchronization with said eNB;
   determining a downlink frame timing of said eNB;
   monitoring transmissions sent from said eNB for a timing advance (TA) sent from said eNB to a target device;
   obtaining said TA transmitted by said eNB to said target device;
   determining an annulus, $T_{TA}$, around said eNB based on said TA;
   determining an uplink frame burst time for said target device;
   obtaining an uplink frame sent by said target device to said eNB;
   determining a distance, d, from said sensor device to said target device;
   determining a circle, $T_{circle}$, around said sensor device at said distance, d, from said sensor device to said target device;
   determining a refined locus, $T_l$, based on an intersection of said annulus, $T_{TA}$, and said circle, $T_{circle}$; and
   determining a location of said target device in said refined locus.

2. The method of claim 1 wherein said determining a downlink frame timing of said node comprises:
   determining a propagation delay between said sensor device and said eNB.

3. The method of claim 2 wherein said determining a propagation delay between said sensor device and said eNB comprises:
   calculating $$\Delta t = \frac{d}{c},$$

where $\Delta t$ is a time difference between observed frame boundaries of said sensor device and sent frame boundaries of said eNB, d is a distance said sensor device is located from said eNB, and c is the speed of light.

4. The method of claim 1 wherein said determining an annulus, $T_{T4}$, around said eNB based on said TA comprises:

calculating $T_{T4}=A'\backslash A''$ where $\{A': |p| \leq a\beta+\beta/2\}$ and $\{A'': |p| < a\beta-\beta/2\}$ where $\beta$ is a spatial resolution of $T_A$, a $\in \mathbb{Z}$ is said $T_A$ value issued by said eNB, and $p \in \mathbb{R}^2$ is a set of positions in said cellular service area.

5. The method of claim 1 wherein said determining an uplink frame burst time for said target device said comprises:

calculating $$t_{tx} = t_{fb} - a\frac{16}{2(15000 \times 2048)},$$

where $t_{tx}$ is said uplink frame burst time, $t_{fb}$ is the eNB frame boundary time, a is an integer timing advance value found in a MAC control element sent from said eNB.

6. The method of claim 1 wherein said determining a distance of said sensor device to said target devices comprises:

determining $$d = \frac{\Delta t}{c},$$

wherein d is a distance between said sensor device and said target device, $\Delta t$ is a time difference from when said target device sent an uplink frame and when said sensor device receives said uplink frame sent from said target device, and c is the speed of light in a vacuum.

7. The method of claim 1 wherein said determining a circle, $T_{circle}$, around said sensor device at said distance, d, from said sensor device to said target device comprises:

calculating $\{T_{circle}: |p|=d\}$ where d is a calculated distance from said sensor to said target device.

8. The method of claim 1 wherein said determining a refined locus based on an intersection of said annulus and said circle comprises:

calculating $T_l = T_{T4} \cap T_{Circle}$, where $T_l$ is said refined locus annulus, $T_{T4}$ is said annulus, and $T_{circle}$, is said circle.

9. The method of claim 1 wherein determining a location of said target device comprises:

calculating a position as a position estimate using $\hat{p}=\min_p \|p-p_c\|$, where $\hat{p}$ is said position estimate, $p=(x,y)$ is any point in $T=T_{circle} \cap T_l$, and $p_c=(x_c,y_c)$ such that $p_c$ is a center of mass of T.

10. A cellular device for cellular synchronization assisted location estimation of a target device in a cellular service area comprising:

an antenna for monitoring and receiving communications transmitted over a LTE/LTE-A network; and a processing component configured to perform a method for cellular synchronization assisted location estimation of a target device, said method comprising:

obtaining a location of said sensor device;

obtaining a location of an evolved NodeB (eNB) in an LTE/LTE-A network;

establishing downlink synchronization with said eNB;

determining a downlink frame timing of said eNB;

monitoring transmissions sent from said eNB for a timing advance (TA) sent from said eNB to a target device;

obtaining said TA transmitted by said eNB to said target device;

determining an annulus, $T_{T4}$, around said eNB based on said TA;

determining an uplink frame burst time for said target device;

obtaining an uplink frame sent by said target device to said eNB;

determining a distance, d, from said sensor device to said target device;

determining a circle, $T_{circle}$, around said sensor device at said distance, d, from said sensor device to said target device;

determining a refined locus, $T_l$, based on an intersection of said annulus, $T_{T4}$, and said circle, $T_{circle}$; and determining a location of said target device in said refined locus.

11. The cellular device of claim 10 further comprising:

a locator device communicatively coupled to said cellular device.

12. The cellular device of claim 10, wherein said determining a downlink frame timing of said node comprises:

determining a propagation delay between said sensor device and said eNB.

13. The cellular device of claim 12 wherein said determining a propagation delay between said sensor device and said eNB comprises:

calculating $$\Delta t = \frac{d}{c},$$

where $\Delta t$ is a time difference between observed frame boundaries of said sensor device and sent frame boundaries of said eNB, d is the distance said sensor device is located from said eNB, and c is the speed of light.

14. The cellular device of claim 10 wherein said determining an annulus, $T_{T4}$, around said eNB based on said TA comprises:

calculating $T_{T4}=A'\backslash A''$ where $\{A': |p| \leq a\beta+\beta/2\}$ and $\{A'': |p| < a\beta-\beta/2\}$ where $\beta$ is a spatial resolution of $T_A$, a $\in \mathbb{Z}$ is said $T_A$ value issued by said eNB, and $p \in \mathbb{R}^2$ is a set of positions in said cellular service area.

15. The cellular device of claim 10 wherein said determining an uplink frame burst time for said target device said comprises:

calculating $$t_{tx} = t_{fb} - a\frac{16}{2(15000 \times 2048)},$$

where $t_{tx}$ is said uplink frame burst time, $t_{fb}$ is a eNB frame boundary time, a is an integer timing advance value found in a MAC control element sent from said eNB.

16. The cellular device of claim 10 wherein said determining a distance of said sensor device to said target devices comprises:

determining $$d = \frac{\Delta t}{c},$$

wherein d is the distance between said sensor device and said target device, $\Delta t$ is a time difference from when said target device sent an uplink frame and when said sensor device receives said uplink frame sent from said target device, and c is the speed of light in a vacuum.

17. The cellular device of claim 10 wherein said determining a circle, $T_{circle}$, around said sensor device at said distance, d, from said sensor device to said target device comprises:
   calculating $\{T_{circle}:|p|=d\}$ where d is a calculated distance from said sensor to said target device.

18. The cellular device of claim 10 wherein said determining a refined locus based on an intersection of said annulus and said circle comprises:
   calculating $T_I = T_{TA} \cap T_{Circle}$, where $T_I$ is said refined locus annulus, $T_{TA}$ is said annulus, and $T_{circle}$ is said circle.

19. The cellular device of claim 10 wherein determining a location of said target device comprises:
   calculating a position as a position estimate using $$\hat{p} = \min_{p} \|p - p_c\|,$$

where $\hat{p}$ is said position estimate, $p=(x,y)$ is any point in $T=T_{circle} \cap T_I$, and $p_c=(x_c,y_c)$ such that $p_c$ is a center of mass of T.

* * * * *